United States Patent
Rivers

[19]

[11] Patent Number: 6,151,340
[45] Date of Patent: Nov. 21, 2000

[54] METHOD AND APPARATUS FOR LOCKING THE WAVELENGTH OF BEACON BEAM IN A FREE-SPACE LASER COMMUNICATIONS SYSTEM

[75] Inventor: Michael D. Rivers, Santee, Calif.

[73] Assignee: Trex Communications Corp., San Diego, Calif.

[21] Appl. No.: 09/123,565

[22] Filed: Jul. 27, 1998

Related U.S. Application Data

[63] Continuation of application No. 08/667,400, Jun. 21, 1996, Pat. No. 5,801,866, which is a continuation-in-part of application No. 08/221,527, Apr. 1, 1994, Pat. No. 5,754,323, which is a continuation-in-part of application No. 08/199,115, Feb. 22, 1994, Pat. No. 5,710,652, which is a continuation-in-part of application No. 07/935,899, Aug. 27, 1992, Pat. No. 5,731,585.

[51] Int. Cl.[7] .................................................. H01S 3/13
[52] U.S. Cl. ........................... 372/32; 372/187; 372/159
[58] Field of Search .............................. 372/32, 18–20, 372/34, 11, 29; 359/172, 187

[56] References Cited

U.S. PATENT DOCUMENTS

| | | | |
|---|---|---|---|
| 5,854,702 | 12/1998 | Ishikawa et al. | 359/152 |
| 5,966,229 | 10/1999 | Dodley et al. | 359/187 |

Primary Examiner—Frank G. Font
Assistant Examiner—Delma R. Flores Ruiz
Attorney, Agent, or Firm—Fish & Richardson P.C.

[57] ABSTRACT

A method and apparatus for setting the wavelength of a laser beacon in a free-space laser communication system. The invention uses the absorption and transmission attributes of a material, such as cesium, to generate a physical environment at the transmitting transceiver that essentially exactly replicates the environment that governs the physics of an atomic line filter at a receiving transceiver that is based on the absorption and transmission attributes of the same material. In general, the invention includes an apparatus for setting the wavelength of a laser beacon in a free-space laser communication system, comprising: a wavelength-tunable laser beacon having an output beam; optical means for directing at least part of the output beam through an absorption cell having at least one absorption peak; a photodetector positioned relative to the absorption cell for detecting wavelengths output from the absorption cell corresponding to a selected range of wavelengths for the output beam; a circuit, coupled to the wavelength-tunable laser beacon and the photodetector, for determining laser beacon tuning parameters corresponding to at least one absorption peak from the detected wavelengths and for setting a wavelength for the output beam corresponding to the determined tuning parameters.

23 Claims, 3 Drawing Sheets

METHOD AND APPARATUS FOR LOCKING THE WAVELENGTH OF BEACON BEAM IN A FREE-SPACE LASER COMMUNICATIONS SYSTEM

CROSS-REFERENCE TO RELATED APPLICATIONS

This application is a continuation-in-part of Ser. No. 08/667,400, filed Jun. 21, 1996, entitled "Laser Communication Device", now U.S. Pat. No. 5,801,866 issued Sep. 1, 1998.

Ser. No. 08/667,400, is a continuation-in-part of Ser. No. 08/221,527, filed Apr. 1, 1994, entitled "Point-to-Point Laser Communication Device" now U.S. Pat. No. 5,754,323 issued May 19, 1998, and of Ser. No. 08/199,115, filed Feb. 22, 1994, entitled "Laser Communication Transceiver and System" now U.S. Pat. No. 5,710,652 issued Jan. 20, 1998, and of Ser. No. 07/935,899, filed Aug. 27, 1992, entitled "Voigt Filter" now U.S. Pat. No. 5,731,585 issued Mar. 24, 1998. Ser. No. 08/221,527, filed Apr. 1, 1994, entitled "Point-to-Point Laser Communication Device" now U.S. Pat. No. 5,754,323 issued May 19, 1998, is a continuation-in-part of Ser. No. 08/199,115, filed Feb. 22, 1994, entitled "Laser Communication Transceiver and System" now U.S. Pat. No. 5,710,652 issued Jan. 20, 1998, and of Ser. No. 07/935,899, filed Aug. 27, 1992, entitled "Voigt Filter" now U.S. Pat. No. 5,731,585 issued Mar. 24, 1998. Ser. No. 08/199,115, filed Feb. 22, 1994, entitled "Laser Communication Transceiver and System" now U.S. Pat. No. 5,710,652 issued Jan. 20, 1998 is a continuation-in-part of Ser. No. 07/935,899, filed Aug. 27, 1992, entitled "Voigt Filter" now U.S. Pat. No. 5,731,585 issued Mar. 24, 1998.

BACKGROUND

1. Technical Field

This invention relates to free-space laser communication systems, and more particularly to a method and apparatus for locking the wavelength of a laser beam in a freespace laser communications system.

2. Background Information

Free-space laser communication systems transmit and receive information by means of a light beam that propagates through space or the atmosphere. When used for air-to-air or air-to-ground communications, such systems pose a number of challenging problems.

One such problem relates to picking targets out of bright backgrounds with wide field of view or long integration time optical acquisition and tracking systems. In such circumstances, background light rejection is essential. Typically, suitable detection systems in a receiving laser transceiver employ very narrow band optical filters, such as atomic line filters A typical embodiment of a free-space laser communication system uses lasers as tracking beacons. That is, each transceiver in the system transmits a laser beam as a tracking beacon, and each remote transceiver acquires and tracks the tracking beacon of a transmitting transceiver in order to permit communications between the transceivers.

A common laser for use as a tracking beacon is a single mode diode laser. Although such diode lasers have very narrow spectral characteristics (typically less than about 20 MHZ), they can be tuned over a range of approximately 30 GHz. Further, the output of such lasers drifts in wavelength with various parameters including temperature and current. If the laser wavelength of a transmitting transceiver is set or drifts outside of the passband of the ALF of a receiving transceiver, no acquisition or tracking can occur. Therefore, it is necessary to employ some means of setting the current and temperature of a transmitting laser so as to generate an output wavelength that corresponds to the ALF passband of a receiving transceiver, even when the transmitting and receiving transceivers are separated by hundreds of kilometers.

Several approaches have been suggested to resolve this problem. One approach is to incorporate an output line filter in the transmitter of each transceiver. For example, a Faraday or Voigt ALF may be incorporated into the beacon laser assembly to filter the output of the laser beacon. One such embodiment is described in allowed U.S. patent application No. 08/221,527, filed Apr. 1, 1994 entitled "Point to Point Laser Communication Device" and assigned to the assignee of the present invention, the teachings of which are incorporated by reference. In such a system, the beacon laser light has the correct wavelength required to pass through the transmitter's output filter only if the drive parameters for the laser are set to the correct value. An external feedback mirror is used to direct light back to the laser cavity. The output coupler in such an implementation is typically about 80% transmissive, so about 20% of the signal is sent back through the ALF to the laser to lock the output wavelength at the necessary value. A monitoring optical detector, such as a photodiode, detects either a reflection off of the output optics or an intercepted portion of the post-filter laser beam. The optical detector is used in a feedback loop to set the laser drive parameters for maximum output at the selected wavelength.

There are two significant problems with this approach. First, the number of optical elements in the beam train make the ALF only about 60% transmissive at best. This is a significant reduction in output power, having a direct negative impact on communications range and data rate. Second, the use of optical feedback to lock the laser wavelength means that the system is very sensitive to vibration and shock, which change the distance between the laser cavity and the external feedback mirror. For air-to-air laser communication applications, the necessary mechanical stability is difficult to achieve.

A second approach is to lock the wavelength of the beacon laser using an external Fabry-Perot etalon. This approach is very similar to using the Faraday filter, except here the wavelength is locked to a resonant mode of the etalon. Unfortunately, there still needs to be some reference to the atomic absorption used in the Faraday receive filter, and the system suffers from the same mechanical stability problems encountered in the transmitter ALF approach described above.

SUMMARY

The invention includes a method and apparatus for setting the wavelength of a laser beacon in a free-space laser communication system. The invention uses the absorption and transmission attributes of a material, such as cesium, to generate a physical environment at the transmitting transceiver that essentially exactly replicates the environment that governs the physics of an atomic line filter at a receiving transceiver that is based on the absorption and transmission attributes of the same material.

In general, the invention includes an apparatus for setting the wavelength of a laser beacon in a free-space laser communication system, comprising: a wavelength-tunable laser beacon having an output beam; optical means for directing at least part of the output beam through an absorption cell having at least one absorption peak; a photodetector positioned relative to the absorption cell for detecting wavelengths output from the absorption cell corresponding to a selected range of wavelengths for the output beam; a circuit, coupled to the wavelength-tunable laser beacon and the photodetector, for determining laser beacon tuning parameters corresponding to at least one absorption peak from the detected wavelengths and for setting a wavelength for the output beam corresponding to the determined tuning parameters.

In another aspect, the invention includes a method for setting the wavelength of a laser beacon in a free-space laser communication system, comprising the steps of: generating an output beam from a wavelength-tunable laser beacon; tuning the output beam over a selected range of wavelengths; directing at least part of the output beam through an absorption cell having at least one absorption peak; detecting wavelengths output from the absorption cell corresponding to the selected range of wavelengths; determining laser beacon tuning parameters corresponding to at least one absorption peak from the detected wavelengths; setting a wavelength for the output beam corresponding to the determined tuning parameters.

In a preferred embodiment, the invention includes a method and apparatus for directing a part of the output beam of a laser beacon through an absorption cell to a photodetector, which is coupled to a feedback circuit that sets the current, and hence wavelength, of the laser beacon. The drive current to a laser diode beacon is ramped over a preset range and an absorption cell photodetector signal is monitored. One or more absorption peaks that mark a corresponding ALF passband are detected at the output of the photodetector, and the corresponding current parameters are determined. Tuning of a laser diode is essentially linear with current. Thus, setting the drive current of the laser diode to a current parameter corresponding to about the center point of one peak, or to between two absorption peaks, sets the output wavelength of the laser diode beacon of the transmitting transceiver to the center of the ALF passband of the receiving transceiver.

Advantages of the invention are simplicity and the fact that the laser wavelength is set using the same absorption peak(s) that form the basis of the ALF of a receiving transceiver. Thus, the output wavelength of the laser beacon of the transmitting transceiver is inherently "locked" to the passband of the ALF of the receiving transceiver, even though there is no physical connection between the receiver and transmitter.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
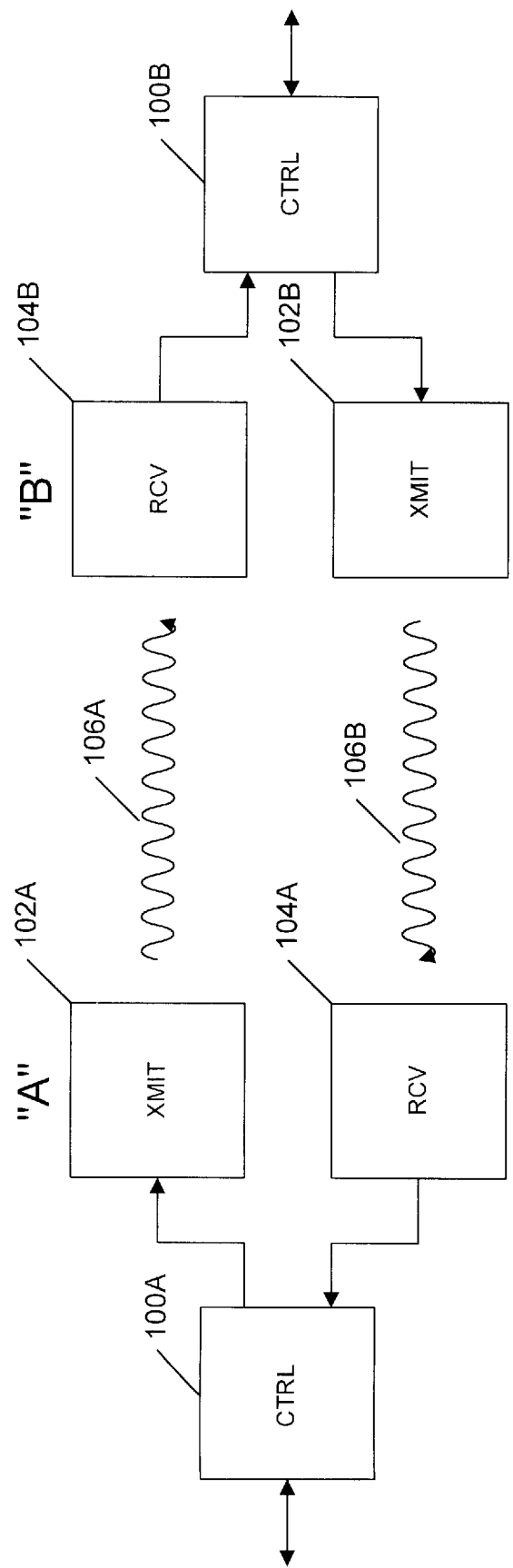
FIG. 1 is a block diagram showing a pair of free-space laser communication transceivers.

FIG. 1 is a block diagram showing a pair of free-space laser communication transceivers. An "A" transceiver includes a control system 100A, a transmitter 102A, and a receiver 104A. A "B" transceiver includes a control system 100B, a transmitter 102B, and a receiver 104B. Transceiver A sends a beacon laser beam 106A from its transmitter 102A to the receiver 104B of transceiver B. Similarly, transceiver B sends a beacon laser beam 106B from its transmitter 102B to the receiver 104A of transceiver A. The beacon lasers allow the transceivers A, B to locate and lock on to each other. Each receiver 104A, 104B includes an atomic line filter based on the absorption characteristics of a particular material, particularly vapors of alkali metals such as cesium, lithium, sodium, potassium, or ribidium. Some alkali earth metals, such as calcium, may also be used. The implementation of the respective control systems 10A, 100B, transmitters 102A, 102B, and receivers 104A, 104B is conventional, except that the optical train of each receiver 104A, 104B has been modified in accordance with the present invention.

Figure 2:
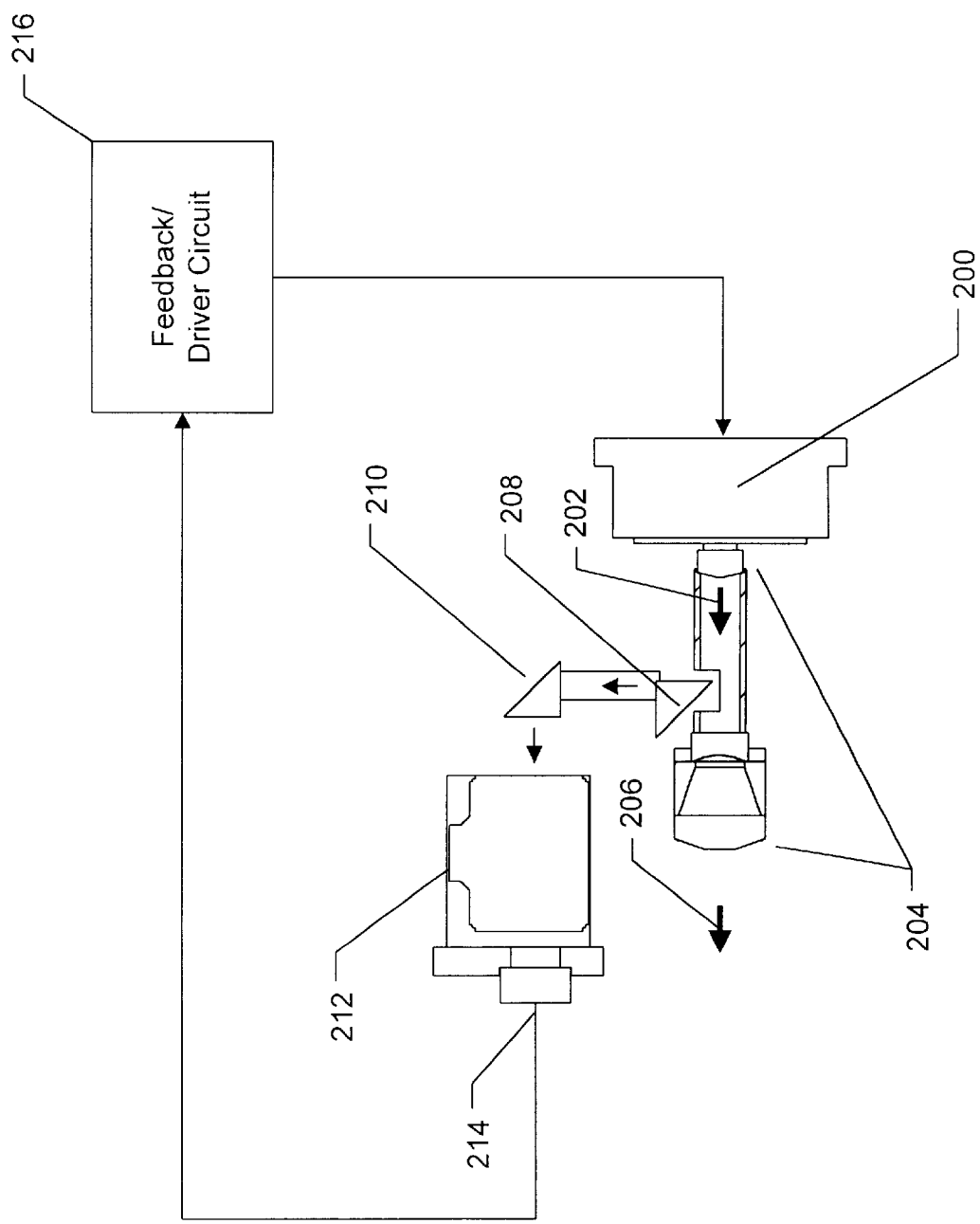
FIG. 2 is a block diagram showing one embodiment of a laser beam frequency locking apparatus for laser communication systems, in accordance with the invention.

FIG. 2 is a block diagram showing one embodiment of a laser beam frequency locking apparatus for laser communication systems, in accordance with the invention. A laser diode 200 generates a tunable laser beam 202 which is coupled through an output optics assembly 204 and emerges as a laser beam beacon 206. A "pickoff" mirror or a beam splitter 208 interposed within the path of the laser beam 202 redirects a small part of the laser beam 202 to a reflector 210, which directs the laser beam through an absorption cell 212. In an alternative embodiment, an optical fiber may be used to redirect a portion of the laser beam 202 to the absorption cell 212. The redirected beam passes through the absorption cell 212 to a photodetector 214, which may be, for example, a photodiode. The output of the photodetector 214 is coupled to a feedback/driver circuit 216 that sets the driving current, and hence wavelength, of the laser diode 200. During an initial calibration, the feedback/driver circuit 216 ramps the drive current to the laser diode 200 over a preset range, thus changing the wavelength of the laser beam 202 over a selected range. The light output through the absorption cell 212 received by the photodetector 214 is monitored by the feedback/driver circuit 216.

The laser diode 200 can be configured so that the laser wavelength within a certain spectral range is monotonically dependent on the driving current at a given temperature or a temperature range. In particular, within the certain spectral range, the values of the driving current can be calibrated with respect to one or more known wavelengths to represent absolute wavelengths of the laser output. Hence, the laser wavelength of the laser diode 200 can be controlled at a desired wavelength or scanned over a desired wavelength range by controlling the driving current.

The absorption cell 212 includes an optically absorbing medium having at least one absorption line at a specified wavelength. The absorption line can be used as a wavelength standard with respect to which the laser wavelength is determined. Light absorption at the specified wavelength can be used to calibrate the current values to correspond to wavelength values.

In the preferred embodiment, the absorption cell 212 is an atomic vapor cell having a heating element (e.g., an oven). In operation, the absorption cell 212 is heated to an elevated temperature to provide a sufficient vapor density to generate measurable one or more absorption peaks, in known fashion. For example, cesium atoms absorb strongly at two closely-spaced wavelengths near 852 nm which are about 9.2 GHZ apart, i.e., from the two hyperfine ground levels at 6 $S_{1/2}$ to the excited state 6 $P_{3/2}$. This same characteristic is used to define the passband for a cesium-based ALF. However, any other alkali atoms or materials having pronounced characteristics may be used for both an ALF and a laser beacon.

In one embodiment, two reasonably closely-spaced absorption peaks which mark the limits of a corresponding ALF passband are detected at the output of the photodetector 214. A conventional peak detector may be used to make this determination. Alternatively, the leading and/or trailing edges of the peaks may be detected with suitable circuitry. Upon determining the peaks or edges of the two absorption peaks, the corresponding current parameters for the laser diode 200 are determined and at least temporarily saved by the feedback/driver circuit 216, in either analog or digital form. Tuning of the laser diode 200 is essentially linear with current within a certain current range. Thus, setting the drive current of the laser diode 200 to correspond to about the center point between the two absorption peaks sets the output wavelength of the laser diode 200 of the transmitting transceiver to about the center of the ALF passband of a receiving transceiver based upon the same absorption characteristics.

For example, if the driving current applied to the laser diode 200 is respectively 140 mA and 150 mA at the two absorption peaks near 852 nm, then a current setting of about 145 mA will ensure that the wavelength of the laser beam 202 is between the two absorption peaks, and thus within the passband of an ALF that is based on the same cesium absorption characteristics.

In a second embodiment, if the ALF is based on a single absorption peak with feedback maintaining the passband of the ALF around the peak, only one absorption peak needs be detected at the output of the photodetector 214. A conventional peak detector may be used to make this determination. In a variation of this embodiment, the leading and/or trailing edges of the peak may be detected with suitable circuitry. Upon determining the peak or edges of the selected absorption peak, the corresponding current parameters for the laser diode 200 are determined and at least temporarily saved by the feedback/driver circuit 216, in either analog or digital form. Setting the driving current of the laser diode 200 to correspond to about the center point of the detected absorption peak sets the output wavelength of the laser diode 200 of the transmitting transceiver to about the center of the ALF passband of a receiving transceiver based upon the same absorption characteristics.

In practice, once the current for the laser diode 200 is set and the temperature of the laser diode 200 stabilized, the laser diode wavelength will remain at the set point. However, it may be desirable to periodically run a calibration routine to allow periodic checking and adjustment of the laser diode current, and thus of the wavelength of the laser beam 202. If desired, the physical configuration shown in FIG. 2 can be modified to withdraw the pickoff mirror 208 interposed within the path of the laser beam 202 after each calibration to increase the amount of transmitted light.

The diode laser 200 may be implemented with a single-frequency distributed feedback laser. The driving current is controlled at a desired current value with a deviation preferably less than about 3 $\mu$A and more preferably less than 1.5 $\mu$A. In terms of the frequency stability, the driving current is preferably controlled in such a way that the frequency jittering of the diode laser 200 is less than about 10 MHZ.

Figure 3:
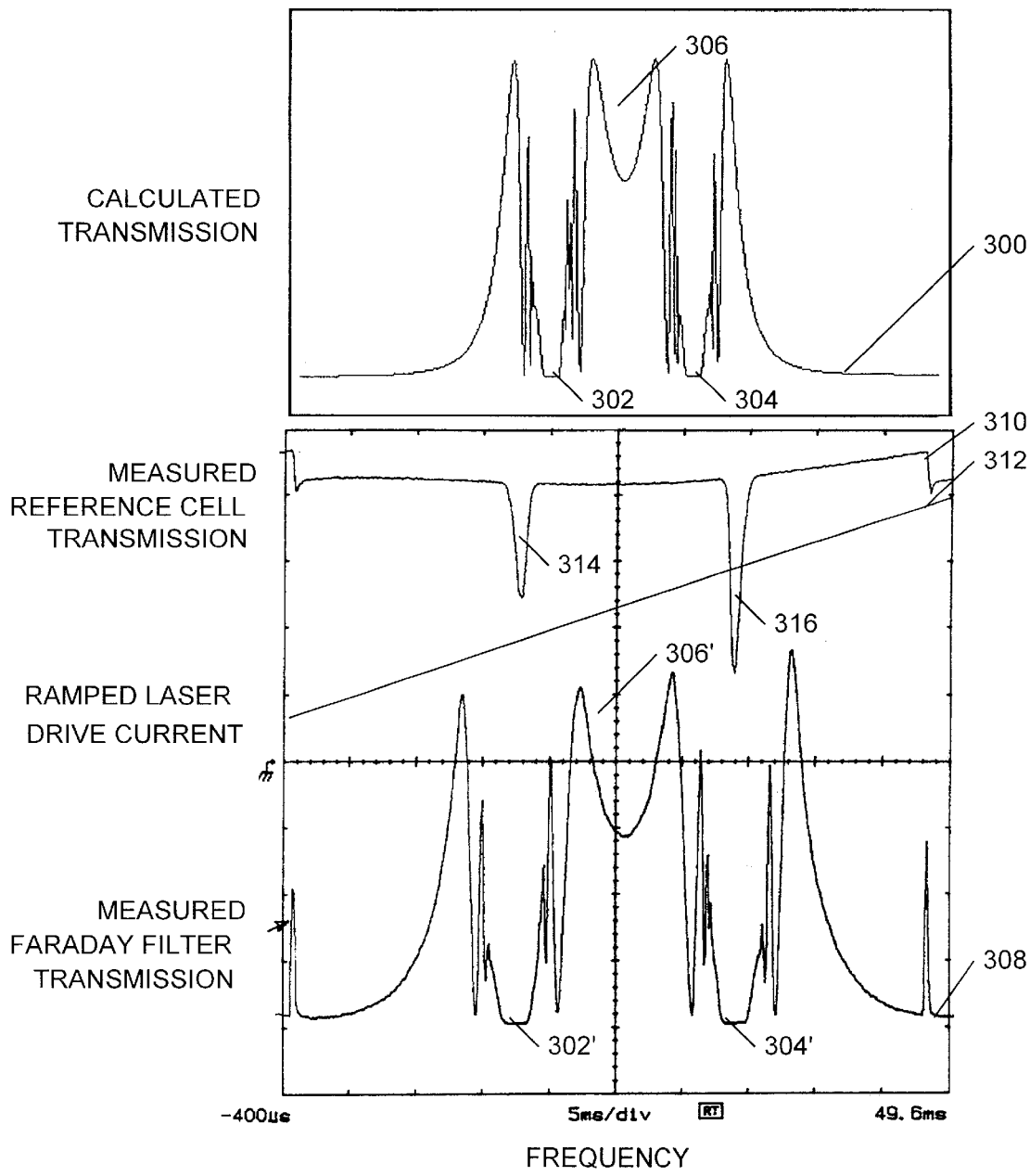
FIG. 3 is a set of graphs of the calculated and measured transmission of a cesiumbased atomic line filter, along with the transmission spectrum of a cesium absorption reference cell in a laser diode beacon assembly.

FIG. 3 is a set of graphs of the calculated and measured transmission of a cesium-based atomic line filter, along with the transmission spectrum of a cesium absorption reference cell in a laser diode beacon assembly. The calculated ALF transmission graph 300 shows the sharp theoretical bandpass characteristics of a cesium-based ALF, with two narrow absorption bands 302, 304 near 852 nm. Primary transmission of the ALF is at a central band 306. The measured Faraday filter transmission graph 308 shows the actual bandpass characteristics of a particular cesium-based ALF (e.g, Model CS-1.0) available from ThermoTrex Corporation of San Diego. This ALF has two narrow absorption bands 302', 304' corresponding to the absorption peaks near 853 nm. Primary transmission of the ALF is at a central band 306'. As shown, the calculated and measured transmission characteristics are in close agreement.

The measured reference cell transmission graph 310 is obtained by passing the output of the laser diode 200 through the cesium absorption cell 214 over a range of wavelengths. As noted above, the current applied to the laser diode 200 is linearly ramped, as shown by the ramped laser drive current graph 312. The laser light is sharply absorbed by the cesium in the cesium absorption cell 214 at two peaks 314, 316, corresponding to the two absorption peaks near 852 nm. As the graphs indicate, the absorption characteristics of the cesium absorption cell 214 are essentially the same as the absorption characteristics of a cesium-based ALF.

A third embodiment eliminates the absorption cell 212 and the feedback loop as permanent components of the laser communication device shown in FIG. 2. This simplifies the laser communication device. An independent calibration apparatus is to calibrate the driving current of the laser diode 200 using known wavelength standards so that a monotonic relation between the driving current and a range of absolute wavelengths laser wavelength is established to cover the passband of the ALF. For example, an absorption cell as a wavelength standard and/or a spectrum analyzing device (e.g., a wavemeter or a spectrum analyzer) can be used for such calibration. A wavelength standard can have a known wavelength outside the passband of the ALF as long as the absolute wavelengths corresponding to a range of the driving current cover the passband of the ALF. Based on the calibration, the driver circuit 216 can be configured to control the driving current at a desired value that corresponds to a laser wavelength near or at the center of the passband of the ALF. In this embodiment, the laser diode 200 may need a routine calibration after a period of use.

Advantages of the invention are simplicity and the fact that the laser wavelength is set using the same absorption peak(s) that form the basis of the ALF of a receiving transceiver. Thus, the output wavelength of the laser beacon of the transmitting transceiver is inherently "locked" to the passband of the ALF of the receiving transceiver, even though there is no physical connection between the receiver and transmitter.

A number of embodiments of the present invention have been described. Nevertheless, it will be understood that various modifications may be made without departing from the spirit and scope of the invention. For example, while a laser diode is the preferred device for implementing embodiments of the invention, the invention may be used with any tunable laser. As another example, although current is the preferred parameter to set the wavelength of the laser, a corresponding voltage or other parameter can be used for the determined set point. Accordingly, other embodiments are within the scope of the following claims.

What is claimed is:

1. An apparatus for setting the wavelength of a laser beacon in a free-space laser communication system, comprising:

(a) a wavelength-tunable laser beacon having an output beam;

(b) an optical module disposed relative to the laser beacon to direct at least part of the output beam through an absorption cell having at least one absorption peak;

(c) a photodetector positioned relative to the absorption cell for detecting wavelengths output from the absorption cell corresponding to a selected range of wavelengths for the output beam;

(d) a circuit, coupled to the wavelength-tunable laser beacon and the photodetector and configaued to determine laser beacon tuning parameters corresponding to at least one absorption peak from the detected wavelengths and for setting a wavelength for the output beam corresponding to the determined tuning parameters.

2. The apparatus of claim 1, wherein the absorption cell has absorption characteristics corresponding to light filtering characteristics of a transceiver in the free-space laser communication system receiving the output beam from the laser beacon.

3. The apparatus of claim 1, wherein the absorption cell is a cesium absorption cell.

4. The apparatus of claim 1, wherein the wavelength-tunable laser beacon includes a laser diode and the laser beacon tuning parameters include a driving current supplied to the laser diode.

5. The apparatus of claim 4, wherein the laser tuning parameters include a temperature of the laser diode.

6. A method for setting the wavelength of a laser beacon in a free-space laser communication system, comprising the steps of:

(a) generating an output beam from a wavelength-tunable laser beacon;

(b) tuning the output beam over a selected range of wavelengths;

(c) directing at least part of the output beam through an absorption cell having at least one absorption peak;

(d) detecting wavelengths output from the absorption cell corresponding to the selected range of wavelengths;

(e) determining laser beacon tuning parameters corresponding to at least one absorption peak from the detected wavelengths; and (f) setting a wavelength for the output beam corresponding to the determined tuning parameters.

7. The method of claim 6, wherein the absorption cell has absorption characteristics corresponding to light filtering characteristics of a transceiver in the free-space laser communication system receiving the output beam from the laser beacon.

8. The method of claim 6, wherein the absorption cell is a cesium absorption cell.

9. An apparatus for setting the wavelength of a laser beacon in a free-space laser communication system, comprising:

(a) a wavelength-tunable laser beacon having an output beam;

(b) an optical module disposed relative to the laser beacon to direct at least part of the output beam through an absorption cell having at least two closely-spaced absorption peaks;

(c) a photodetector positioned relative to the absorption cell for detecting wavelengths output from the absorption cell corresponding to a selected range of wavelengths for the output beam;

(d) a circuit, coupled to the wavelength-tunable laser beacon and the photodetector and configured to determine laser beacon tuning parameters corresponding to at least two absorption peaks from the detected wavelengths, for generating a laser beacon tuning parameter between the determined tuning parameters, and for setting a wavelength for the output beam corresponding to the generated tuning parameter.

10. The apparatus of claim 9, wherein the absorption cell has absorption characteristics corresponding to light filtering characteristics of a transceiver in the free-space laser communication system receiving the output beam from the laser beacon.

11. The apparatus of claim 9, wherein the wavelength-tunable laser beacon includes a laser diode and the laser beacon tuning parameters include a driving current supplied to the laser diode.

12. The apparatus of claim 11, wherein the laser tuning parameters include a temperature of the laser diode.

13. A method for setting the wavelength of a laser beacon in a free-space laser communication system, comprising the steps of:

(a) generating an output beam from a wavelength-tunable laser beacon;

(b) tuning the output beam over a selected range of wavelengths;

(c) directing at least part of the output beam through an absorption cell having at least two closely-spaced absorption peaks;

(d) detecting wavelengths output from the absorption cell corresponding to the selected range of wavelengths;

(e) determining laser beacon tuning parameters corresponding to at least two absorption peaks from the detected wavelengths;

(f) generating a laser beacon tuning parameter between the determined tuning parameters;

(g) setting a wavelength for the output beam corresponding to the generated tuning parameter.

14. The method of claim 13, wherein the absorption cell has absorption characteristics corresponding to light filtering characteristics of a transceiver in the free-space laser communication system receiving the output beam from the laser beacon.

15. The method of claim 13, wherein the absorption cell is a cesium absorption cell.

16. A system for locking the wavelength of a laser beacon of a transmitting transceiver in a free-space laser communication system to the passband of an atomic line filter of a receiving transceiver, comprising:

(a) a wavelength-tunable laser beacon having an output beam;

(b) optical means for directing at least part of the output beam through an absorption cell having at least two closely-spaced absorption peaks corresponding to light filtering characteristics of the atomic line filter of the receiving transceiver;

(c) a photodetector positioned relative to the absorption cell for detecting wavelengths output from the absorption cell corresponding to a selected range of wavelengths for the output beam;

(d) a circuit, coupled to the wavelength-tunable laser beacon and the photodetector, for determining laser beacon tuning parameters corresponding to at least two absorption peaks from the detected wavelengths, for generating a laser beacon tuning parameter between the determined tuning parameters, and for setting a wavelength for the output beam corresponding to the generated tuning parameter.

17. The system of claim 16, wherein the absorption cell is a cesium absorption cell.

18. A method for locking the wavelength of a laser beacon of a transmitting transceiver in a free-space laser communication system to the passband of an atomic line filter of a receiving transceiver, comprising the steps of:

(a) generating an output beam from a wavelength-tunable laser beacon;

(b) tuning the output beam over a selected range of wavelengths;

(c) directing at least part of the output beam through an absorption cell having at least two closely-spaced absorption peaks corresponding to light filtering characteristics of the atomic line filter of the receiving transceiver;

(d) detecting wavelengths output from the absorption cell corresponding to the selected range of wavelengths;

(e) determining laser beacon tuning parameters corresponding to at least two absorption peaks from the detected wavelengths;

(f) generating a laser beacon tuning parameter between the determined tuning parameters;

(g) setting a wavelength for the output beam corresponding to the generated tuning parameter.

19. The method of claim 18, wherein the absorption cell is a cesium absorption cell.

20. A free-space laser communication system, comprising:

(a) a laser transmitter, including:

(1) a wavelength-tunable laser diode operable to produce an output beam having a laser wavelength determined by a driving current, wherein the laser wavelength is tunable within a first wavelength range in response to a current tuning range of the driving current in which the laser wavelength is monotonically dependent on the driving current;

(2) a laser control circuit coupled to the wavelength-tunable laser diode to control the driving current and operable to maintain the driving current at a predetermined value to control the laser wavelength at a predetermined laser wavelength within the first wavelength range, wherein the laser control circuit is calibrated with respect to at least one known frequency standard so that each current value with the current tuning range corresponds to a single wavelength within said first wavelength range; and (b) a laser receiver having an atomic line filter with a transmission band defined by a second wavelength range that includes the predetermined laser wavelength of the wavelength-tunable laser diode and operating to selectively receive an optical signal at a desired wavelength with the second wavelength range.

21. The system of claim 20, wherein the laser control circuit is configured to produce the predetermined driving current with a current jittering less than about 3 $\mu$A.

22. The system of claim 20, wherein the laser control circuit is configured to control the laser wavelength at a desired wavelength with a frequency jittering less than about 10 MHZ.

23. A method for locking the wavelength of a laser diode of a transmitting transceiver in a free-space laser communication system to the passband of an atomic line filter of a receiving transceiver, comprising:

(a) generating an output laser beam from the laser diode by providing a driving current;

(b) determining absolute wavelength values of the laser diode in a tunable wavelength range corresponding to a selected range of the driving current by using at least one wavelength standard, wherein the tunable wavelength range includes the passband of the atomic line filter;

(c) determining a selected driving current value at which the wavelength of the output laser beam from the laser diode is at or near the center of the passband of the atomic line filter according to the step (b); and (d) setting and maintaining the driving current at the selected driving current to control the wavelength of the laser diode at or near the center of the passband of the atomic line filter.

* * * * *